(12) United States Patent
Heege et al.

(10) Patent No.: US 10,436,246 B2
(45) Date of Patent: Oct. 8, 2019

(54) BEARING SUPPORT COMPOSED OF FIBER-PLASTIC COMPOSITE

(71) Applicant: Aktiebolaget SKF, Gothenburg (SE)

(72) Inventors: Thomas Heege, Sennfeld (DE); Hans-Juergen Friedrich, Koenigsberg-Roemershofen (DE); Helmut Hauck, Euerbach (DE); Andreas Klopf, Rannungen (DE); Michael Tschirschwitz, Schweinfurt (DE); Juergen Weiglein, Oerlenbach (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/516,280

(22) PCT Filed: Oct. 5, 2015

(86) PCT No.: PCT/EP2015/072883
§ 371 (c)(1),
(2) Date: Mar. 31, 2017

(87) PCT Pub. No.: WO2016/055391
PCT Pub. Date: Apr. 14, 2016

(65) Prior Publication Data
US 2017/0307008 A1  Oct. 26, 2017

(30) Foreign Application Priority Data
Oct. 8, 2014  (DE) ........................ 10 2014 220 375

(51) Int. Cl.
*F16C 21/00* (2006.01)
*F16C 35/04* (2006.01)
(Continued)

(52) U.S. Cl.
CPC .............. *F16C 21/00* (2013.01); *F16C 19/54* (2013.01); *F16C 33/208* (2013.01);
(Continued)

(58) Field of Classification Search
CPC ........ F16C 33/20; F16C 33/28; F16C 33/581; F16C 17/00; F16C 17/02; F16C 17/12;
(Continued)

(56) References Cited

U.S. PATENT DOCUMENTS

| 3,328,100 A | 6/1967 | Spokes et al. |
| 3,864,197 A | 2/1975 | Shobert |

(Continued)

FOREIGN PATENT DOCUMENTS

| CN | 103201531 A | 7/2013 |
| DE | 2033273 A1 | 1/1972 |

(Continued)

OTHER PUBLICATIONS

Machine Translation of JPH 11-62976 dated Mar. 1995 (Year: 1995).*

(Continued)

*Primary Examiner* — Alan B Waits
(74) *Attorney, Agent, or Firm* — Bryan Peckjian; SKF USA Inc. Patent Dept.

(57) ABSTRACT

A bearing support includes at least one sliding bearing defined by the bearing support and/or at least one rolling-element bearing having an outer raceway defined by the bearing support. The bearing support is formed from a fiber-plastic composite and includes an integrally formed sliding surface of the sliding bearing and/or an integrally formed raceway for rolling elements of the rolling-element bearing, and the fiber-plastic composite includes a matrix into which spatially oriented sliding fibers, for example, PTFE fibers, are embedded in a region of the sliding surface of the sliding bearing and/or a region of the raceway of the rolling-element bearing.

8 Claims, 2 Drawing Sheets

(51) Int. Cl.
  *F16C 19/54* (2006.01)
  *F16C 33/20* (2006.01)
  *F16H 57/021* (2012.01)
  *F16C 33/58* (2006.01)
  *F16C 35/02* (2006.01)

(52) U.S. Cl.
  CPC ............ *F16C 33/581* (2013.01); *F16C 35/02* (2013.01); *F16C 35/042* (2013.01); *F16C 35/045* (2013.01); *F16H 57/021* (2013.01); *F16C 2208/82* (2013.01); *F16C 2208/86* (2013.01); *F16C 2361/61* (2013.01)

(58) Field of Classification Search
  CPC .... F16C 21/00; F16C 21/005; F16C 2208/02; F16C 2208/04; F16C 2208/82; F16C 35/02; F16C 35/04; F16C 19/04; F16C 19/06; F16C 19/24; F16C 19/26; F16C 35/045; F16C 35/042; F16C 19/54; F16C 33/208; F16C 2361/61; F16C 2208/86; F16H 57/021
  See application file for complete search history.

(56) References Cited

U.S. PATENT DOCUMENTS 4,148,532 A    4/1979   Inabayashi et al.

| | | | | |
|---|---|---|---|---|
| 2010/0316315 | A1* | 12/2010 | Shimazu | F16C 33/44 384/445 |
| 2016/0340951 | A1* | 11/2016 | Andren | E05D 15/063 |
| 2017/0175812 | A1* | 6/2017 | Masse | F16C 17/02 |

FOREIGN PATENT DOCUMENTS

| | | | | |
|---|---|---|---|---|
| DE | 19961224 | A1 | 5/2001 | |
| DE | 102005032887 | B3 | 12/2006 | |
| DE | 102008007168 | A1 | 8/2009 | |
| DE | 102008017880 | A1 | 10/2009 | |
| DE | 102011009732 | A1 | 8/2012 | |
| DE | 102011081484 | A1 | 2/2013 | |
| DE | 102013004339 | A1 | 9/2014 | |
| DE | 102013223170 | A1 | 9/2014 | |
| DE | 102013206350 | A1 | 10/2014 | |
| EP | 2682620 | A1 | 1/2014 | |
| GB | 2057592 | A | 4/1981 | |
| JP | 11062976 | A | * 3/1999 | ............. F16C 33/62 |

OTHER PUBLICATIONS

Machine Translation of DE 19961224 dated Dec. 1996 (Year: 1996).*
Machine Translation DE 102013004339 dated Sep. 2014 (Year: 2014).*

* cited by examiner

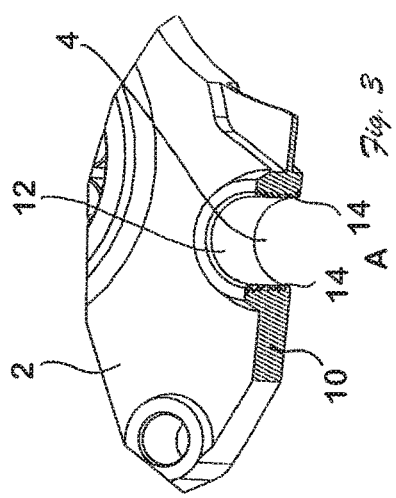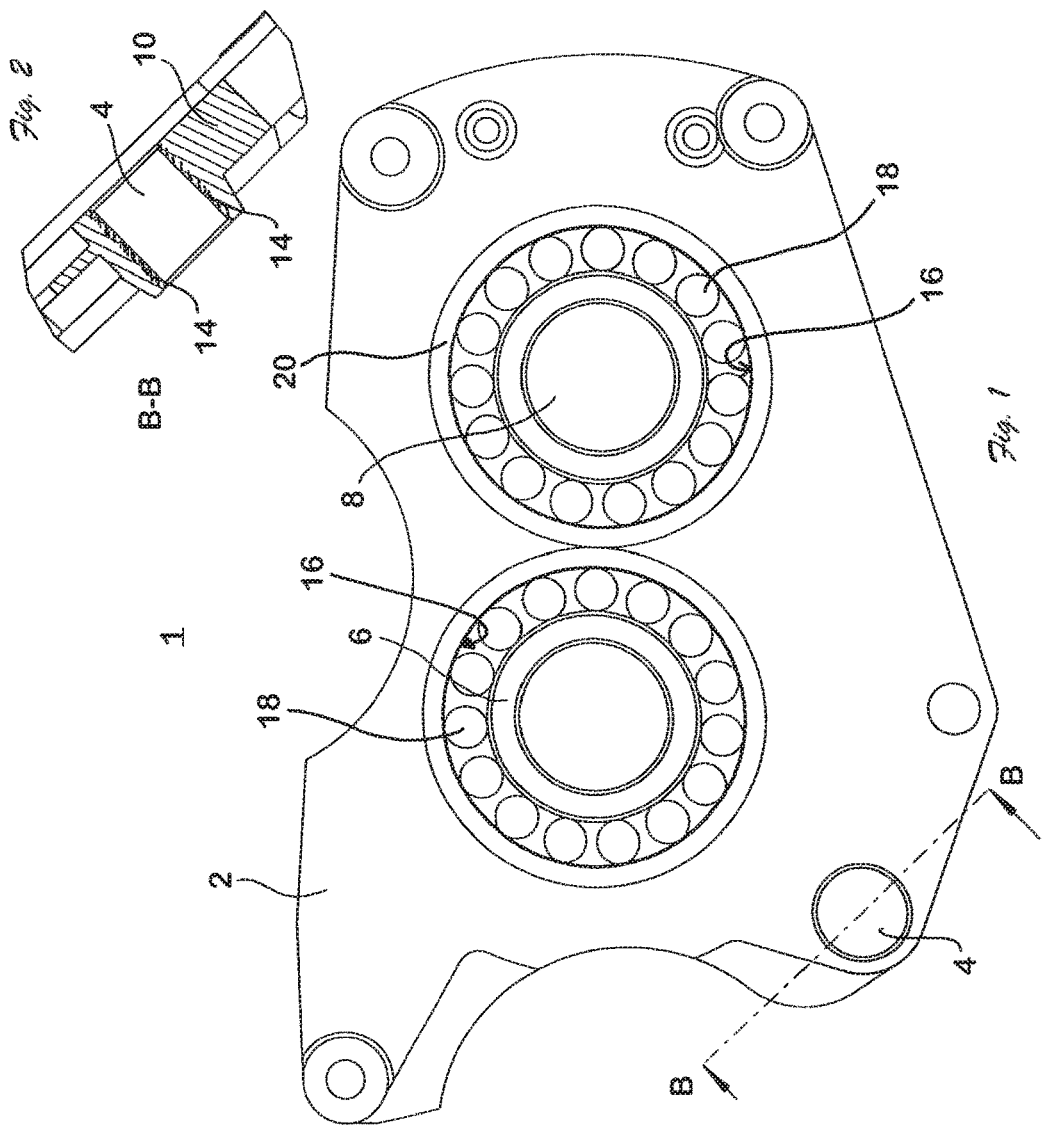

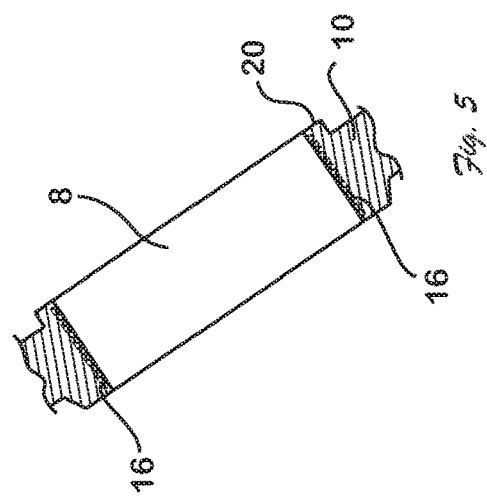
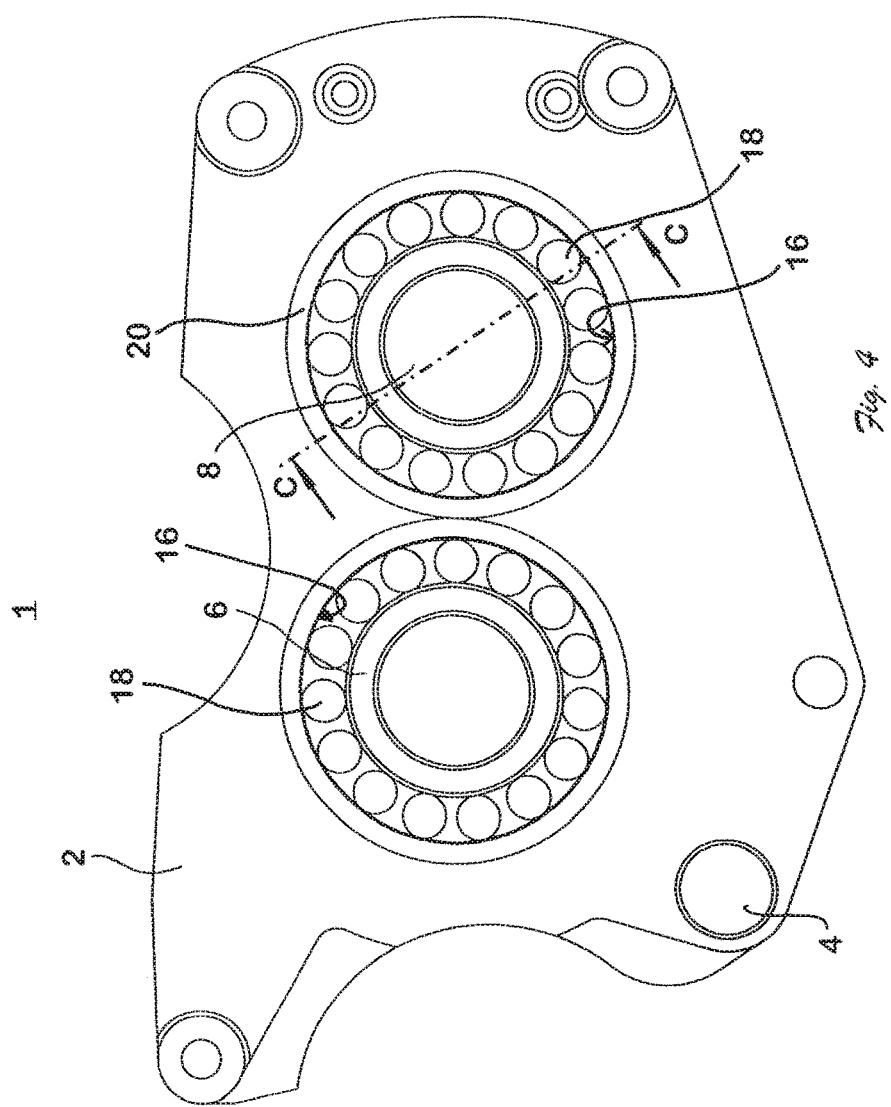

BEARING SUPPORT COMPOSED OF FIBER-PLASTIC COMPOSITE

CROSS-REFERENCE

This application is the U.S. National Stage of International Application No. PCT/EP2015/072883 filed Oct. 5, 2015, which claims priority to German patent application no. 10 2014 220 375.9 filed on Oct. 8, 2014.

TECHNOLOGICAL FIELD

The present invention relates to a bearing support including at least one sliding bearing disposed in the bearing support and/or at least one rolling-element bearing, wherein the bearing support is formed from a fiber-reinforced plastic.

BACKGROUND

Bearing supports are known from the prior art and are usually used to support the shaft of a transmission and an associated shift linkage in manual transmissions of vehicles. Furthermore it is known from the prior art to manufacture the bearing support from a fiber-reinforced plastic, whereby the weight of the bearing support can be reduced. However, in order to form the sliding bearing of the shift linkage on the bearing support, sliding bearing bushings are usually integrated into the plastic. This equally applies for the introducing of a bearing ring for the rolling-element bearing. However, this integrating of sliding bearing bushings or bearing rings is very expensive and requires a special geometry, e.g., an undercut, with which the sliding bearing bushings or bearing rings are secured in their position in the bearing support.

Moreover, an injection-molded bearing support for a pump unit is known from the prior art, in particular DE 10 2013 004 339, wherein the sliding surface of the sliding bearing is manufactured one-piece with the plastic of the bearing support. A tribologically effective plastic is used here in particular. However, since this plastic is very expensive, it is further proposed in this document to manufacture the bearing support with a 2-component injection molding, wherein the tribologically effective plastic is only used in the region of the sliding surface.

However, it is disadvantageous in this prior art that the proposed bearing support is not usable in vehicle construction since overall the injection-molded bearing support is not stable enough to support the forces to be expected with the supporting of a transmission input shaft and an associated shift linkage.

SUMMARY

The object of the present invention is therefore to provide a bearing support for a vehicle, the sliding bearing and/or rolling-element bearing of which bearing support can be manufactured simply and that can support high forces.

According to the invention a bearing support for a vehicle is provided including at least one sliding bearing disposed in the bearing support and/or at least one rolling-element bearing disposed in the bearing support, wherein the bearing support is formed from plastic and includes a sliding surface of the sliding bearing, which sliding surface is formed integrally with the bearing support, and/or a raceway for rolling elements of the rolling-element bearing, which raceway is formed integrally with the bearing support. Here the invention is based on the idea of manufacturing the bearing support and also the sliding surface and/or raceway from a fiber-composite plastic, wherein the fiber-composite plastic has a matrix wherein spatially oriented sliding fibers are embedded in the region of the sliding surface and/or raceway. Since the bearing support itself is configured as the sliding surface for the sliding bearing and/or the raceway for the rolling-element bearing, the expensive introducing of a bearing bushing or a bearing inner ring is omitted, with the result that the bearing support is quickly and simply manufacturable. It is preferred in particular if the sliding fibers are PTFE fibers. In addition to low friction values PTFE also has the advantage that with PTFE a lubricating can be provided of the to-be-supported elements or the bearing elements themselves.

The spatially oriented fibers in turn ensure that forces that act on the sliding surface or the raceway can be dissipated to the bearing support in a targeted manner, since the forces are dissipated along the spatial orientation of the fibers. If at all applicable, in injection-molded bearing supports known from the prior art the fibers are disordered and cannot provide any force-supporting or force dissipation. A further difference consists in that in a fiber-plastic composite the spatially oriented fibers are configured longer than in injection-molded plastics. These longer fibers also effect a better stability and a better force-supporting and -dissipation.

Furthermore it is advantageous if the spatially oriented fibers are embedded in the form of a semi-finished fiber, for example, as a woven fabric and/or as a knitted fabric and/or as a scrim and/or as a preferably tube-shaped mesh. The shapes of the bearing support can thereby be precisely, quickly, and simply formed.

In order to provide a particularly smooth sliding surface for the sliding bearing, or raceway for the rolling-element bearing, sliding fibers that are embedded in the plastic are provided in the region of the first sliding surface of the sliding bearing and/or of the raceway of the rolling-element bearing. Here in particular PTFE fibers are particularly preferred since they have good sliding properties and can simultaneously provide a lubricating of the sliding bearing or rolling-element bearing. These fibers are simultaneously introduced during the manufacturing process at the location of the sliding surface of the sliding bearing and/or raceway of the rolling element so that an additional assembly process of the sliding surface or raceway can be omitted. Furthermore the glass fibers can be configured in the form of a semi-finished fiber, which is surrounded by the matrix plastic.

According to a further advantageous exemplary embodiment the fiber-plastic compound has as matrix a duroplast and/or elastomer and/or thermoplastic. This plastic is constructed as a matrix into which are embedded the spatially oriented fibers in the form of a semi-finished fiber, for example, as a woven fabric and/or as a knitted fabric and/or as a scrim and/or as a preferably tube-shaped mesh. Here the semi-finished fibers can be configured as a pre-formed shapes, for example, as bushings for the sliding bearing.

According to a further advantageous exemplary embodiment the spatially oriented reinforcing fibers can be glass fibers and/or carbon fibers and/or ceramic fibers and/or aramid fibers and/or boron fibers and/or basalt fibers and/or steel fibers and/or natural fibers and/or polyhexamethylene adipic acid amide fibers and/or high-strength fibers made from highly crystalline, highly-stretched, ultra-high-molecular-weight polyethylene. In particular with this inventive design a high efficiency can be achieved with the result that a bearing support having a high tensile strength and a low mass can be achieved even in different operating conditions, such as, for example, differently high temperatures and/or different vibrations. In addition a dimensionally accurate arranging of the receiving area of the bearing supported by the bearing relative to an edge region of the bearing support can be achieved, wherein a cost-effective design is simultaneously made possible.

Particularly preferred is an exemplary embodiment wherein the bearing support is formed from carbon-fiber reinforced plastic, wherein carbon fibers, in particular in multiple layers, are embedded in a plastic matrix made from a thermoset, in particular an epoxy resin. A particularly high tensile strength with low mass and cost-effective formation can thereby be achieved. In the region of the sliding surface of the sliding bearing and/or raceway of the rolling-element bearing the fibers are configured as sliding fibers, in particular as PTFE fibers, with the result that a sliding bearing surface or raceway can be provided that in addition to outstanding sliding properties can also provide a self-lubricating of the sliding bearing or rolling-element bearing.

A further aspect of the present invention relates to a method for manufacturing a bearing support, wherein according to the invention during the providing of a matrix for the bearing support made from a plastic wherein fibers are embedded for reinforcing, a sliding surface for the sliding bearing and/or a raceway for a rolling element of a rolling-element bearing is formed from the fiber-reinforced plastic. Here in the region of the sliding bearing and/or the rolling-element bearing spatially oriented sliding fibers, in particular PTFE fibers, are embedded in the plastic, while in the remaining region substantially spatially oriented reinforcing fibers, in particular glass fibers and/or carbon fibers and/or ceramic fibers, are embedded in the plastic.

Further advantages and advantageous embodiments are defined in the description, the drawings, and the claims.

In the following the invention shall be described in more detail with reference to the exemplary embodiments depicted in the drawings. Here the exemplary embodiments are of a purely exemplary nature and are not intended to establish the scope of the application. This scope is defined solely by the pending claims.

BRIEF DESCRIPTION OF THE DRAWINGS

FIG. 1 shows a schematic plan view of a preferred design of the inventive bearing support;

FIG. 2 shows a schematic sectional view along a line B-B of the bearing support from FIG. 1;

FIG. 3 shows a schematic spatial view through the bearing support from FIG. 1 with a section along the line B-B in FIG. 2;

FIG. 4 shows a schematic plan view of an alternative embodiment of the inventive bearing support; and FIG. 5 shows a schematic spatial view through the bearing support from FIG. 4 with a secing along the line C-C in FIG. 4.

DETAILED DESCRIPTION

In the following identical or functionally equivalent elements are designated by the same reference numbers.

FIGS. 1 to 3 show different views of an inventive bearing support 1 that is usually used in manual transmissions of motor vehicles. Here FIG. 1 shows a schematic plan view of the bearing support 1. The bearing support 1 includes a bearing support plate 2 wherein a sliding bearing 4 for a guiding of a shift linkage (not depicted) is formed. Furthermore rolling-element bearing assemblies 6, 8 are provided in the bearing support 1, which rolling-element bearing assemblies 6, 8 serve for the supporting of the transmission shafts.

The bearing support 1 itself, as schematically depicted in the sectional views of FIGS. 2 and 3, is manufactured from a fiber-plastic composite 10 with spatially oriented fibers. In a fiber-plastic composite, spatially oriented fibers, for example, of a semi-finished fiber, for example as a woven fabric, knitted fabric, scrim, mesh, fleece or as a mat are usually embedded in a plastic matrix that is formed, for example, for a duroplast, an elastomer, and/or a thermoplastic. These reinforcing fibers can be, for example, glass fibers and/or carbon fibers and/or ceramic fibers and serve to form a bearing support 1 with a high tensile strength but a low mass. As can furthermore be seen from the sectional views of FIGS. 2 and 3, a sliding surface 12 of the sliding bearing 4 is integrally produced from the fiber-plastic composite 10, i.e., integrally with the bearing support, wherein in the region of the sliding surface 12 spatially oriented sliding fibers 14 are embedded in the plastic matrix. The sliding fibers 14 can also be configured in the form of a semi-finished fiber, for example, as woven fabric, knitted fabric, scrim, or as mesh, or prefabricated shapes, such as, for example, a bushing shape. Similarly a raceway 16 for a rolling element 18 can be formed integrally with the bearing support 1.

In order to form a sliding surface 12 and/or the raceway 16 here with particularly good sliding properties for the to-be-supported element, in particular the to-be-supported shift linkage or the rolling element 18, PTFE fibers are embedded in the matrix plastic in the region of the sliding bearing 4 and/or the rolling elements 6, which PTFE, fibers ensure a low-friction supporting and simultaneously a lubricating of the sliding bearing 4 or rolling-element bearing 6.

Here the sliding fibers 14 in the fiber composite material 10 are embedded in the matrix plastic during the manufacturing of the bearing support 2 in the same was as the reinforcing fibers.

The embedding or a subsequent attaching of sliding bearing bushings or ball sleeves for forming the sliding bearing 4 can be omitted with the result that costs and also weight can be saved, and the assembly process can be simplified overall. The attaching of a bearing ring for the rolling-element bearing 6 can thereby also be omitted.

However, if an introducing of a rolling-element bearing 8 including a separately formed bearing ring 20 is nonetheless desired, it is thus advantageous in particular to introduce the bearing ring 20 directly into the fiber-reinforced plastic material during the manufacturing process of the bearing carrier 1. For this purpose it is preferred in particular if an undercut is formed on the bearing ring 20, which undercut makes possible an interference-fit attaching of the bearing ring during the forming of the fiber-reinforced plastic matrix of the bearing support 1.

Overall with the integral forming of the sliding bearing surface and/or raceway in the bearing carrier, in particular with the use of PTFE fibers in the region of the sliding bearing, a bearing support with an integral sliding bearing and/or integral rolling-element bearing can be provided, wherein the integrally formed sliding bearing or the integrally formed rolling-element bearing ensures a stable supporting of the to-be-supported elements and simultaneously their lubrication.

REFERENCE NUMBER LIST

1 Bearing support
2 Bearing support plate

4 Sliding bearing
6, 8 Rolling-element bearing
10 Fiber-reinforced plastic
12 Sliding bearing surface
14 Sliding fibers
16 Raceway
18 Rolling element
20 Bearing ring

The invention claimed is:

1. A bearing support comprising:
the bearing support defining an outer raceway for a rolling-element bearing wherein the outer raceway is integrally formed with the bearing support and is configured for rolling elements of the rolling-element bearing, wherein the bearing support is formed from a fiber-plastic composite, wherein the fiber-plastic composite comprises a matrix with a plurality of fibers therein and into which additional spatially oriented sliding fibers are embedded in the region of the outer raceway, the additional spatially oriented sliding fibers being configured to dissipate forces away from the region in a targeted manner, wherein the additional spatially oriented sliding fibers are a tube shaped mesh; and
wherein the outer raceway is formed by a bearing ring disposed on the bearing support.

2. The bearing support according to claim 1, wherein the additional spatially oriented sliding fibers comprise woven fabric.

3. The bearing support according to claim 2, wherein the reinforcing fibers are glass fibers and/or carbon fibers and/or ceramic fibers and/or aramid fibers and/or boron fibers and/or basalt fibers and/or steel fibers and/or natural fibers and/or polyhexamethylene adipic acid amide fibers.

4. The bearing support according to claim 2, wherein the additional spatially oriented sliding fibers comprise a prefabricated or semi-finished structure, wherein the matrix comprises a duroplast and/or an elastomer and/or a thermoplastic, wherein the plurality of fibers comprise PTFE fibers.

5. The bearing support according to claim 1, wherein the additional spatially oriented sliding fibers comprise a prefabricated semi-finished structure.

6. The bearing support according to claim 1, wherein the matrix comprises a duroplast and/or an elastomer and/or a thermoplastic.

7. The bearing support according to claim 1, wherein the sliding fibers comprise PTFE fibers.

8. The bearing support according to claim 1, wherein the fiber-plastic composite comprises a carbon-fiber-reinforced fiber-plastic composite, and wherein the carbon fibers are embedded in the matrix, the matrix comprising an epoxy resin.

* * * * *